United States Patent Office 2,828,334
Patented Mar. 25, 1958

2,828,334

OXYPROPYLATED DERIVATIVES OF SUBSTITUTED PHENOL-SULFONIC ACID SALTS AND METHOD OF MAKING SAME

Melvin De Groote, University City, Mo., assignor to Petrolite Corporation, Wilmington, Del., a corporation of Delaware No Drawing. Application June 8, 1953
Serial No. 360,371

10 Claims. (Cl. 260—512)

This application is a continuation in part of my three copending applications, Serial Numbers 164,856, 164,857, and 164,860, all filed May 27, 1950, all now abandoned.

The first aforementioned copending application is concerned with a sulfonic acid salt of the following structure:

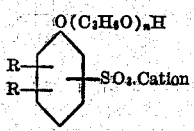

in which R is selected from the class of hydrocarbon substituents and hydrogen atoms, with the proviso that there must be at least one hydrocarbon substituent and that the total number of carbon atoms substituted in the phenolic ring be not less than 5 and not over 20, and with the proviso that $n$ be not less than 10 and not more than 40; and with the further proviso that the corresponding sodium salt

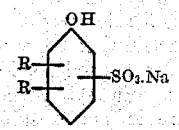

in which the occurrences of R have their previous significance, shall be xylene-insoluble; and the corresponding sodium salt

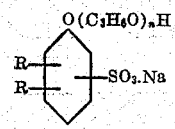

in which the occurrences of R and $n$ have their previous significance and $n$ has the identical value, as previously, shall be xylene-soluble.

The second aforementioned copending application is concerned with a sulfonic acid salt of the following structure:

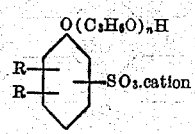

in which R is selected from the class of hydrocarbon substituents and hydrogen atoms, with the proviso that there must be at least one hydrocarbon substituent and that the total number of carbon atoms substituted in the phenolic ring be not less than 12 and not over 35, and with the proviso that $n$ be not less than 10 and not more than 50; and with the further proviso that the corresponding sodium salt

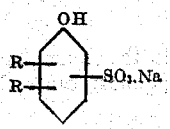

in which the occurrences of R have their previous significance, shall be insoluble in a mixture of two-thirds non-aromatic kerosene and one-third xylene; and the corresponding sodium salt

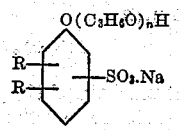

in which the occurrences of R and $n$ have their previous significance and $n$ has the identical value as previously, shall be soluble in a mixture consisting of two-thirds non-aromatic kerosene and one-third xylene.

The third aforementioned copending application is concerned with a sulfonic acid salt of the following composition:

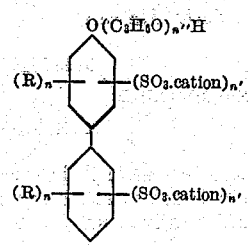

in which R represents an alkyl radical having at least 4 carbon atoms, and $n$ and $n'$ represent a numeral varying from 0 to 3, and $n''$ represents a numeral varying from 50 to 100; with the proviso that there must be at least 2 alkyl substituents in the molecule and at least 2 sulfonic acid groups in the molecule; and with the further proviso that the corresponding sodium salt of the following formula in which all the characters have their previous significance

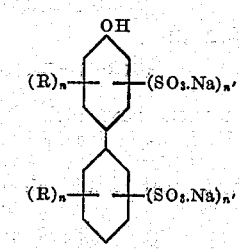

be soluble in water and in xylene but insoluble in a mixture of two-thirds non-aromatic kerosene and one-third xylene; and with the final proviso that said aforementioned oxypropylated derivative be substantially insoluble in water and soluble in a mixture of two-thirds non-aromatic kerosene and one-third xylene.

Thus, one aspect of the present invention is concerned with a water insoluble salt of the following composition:

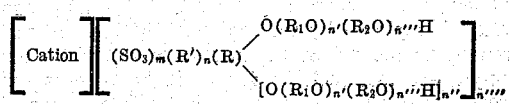

in which R is an aromatic nucleus; R' is a hydrocarbon substituent having not over 22 carbon atoms with the proviso that the combined radical $(R')_nR$ contains not over 2 aromatic rings; $R_1O$ is an alkylenoxy radical derived from a member of the class consisting of ethylene oxide, glycide, and methyl glycide; $R_2O$ is a member of the class of alkylenoxy radicals derived from a member of the class consisting of propylene oxide and butylene oxide; $m$ is a numeral from 1 to 2; $n$ is a numeral from 1 to 4; $n'$ is a numeral from 0 to 5; $n''$ is a numeral from 0 to 1; $n'''$ is a numeral from 15 to 60; $n''''$ is a numeral from 1 to 6 but not greater than the valence equivalency of the cation; said salt being a salt of the acid

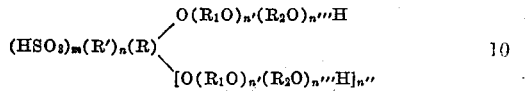

in which the characters have their previous significance; said acid being characterized by the fact that the sodium salt of the precursory acid of the following structure

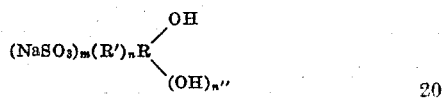

in which the characters have their previous significance, is water soluble and surface active in an aqueous system; furthermore, the derivative salt

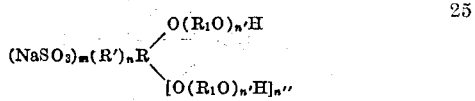

in which the characters have their previous significance, is water soluble and surface active in an aqueous system; additionally, the derivative salt

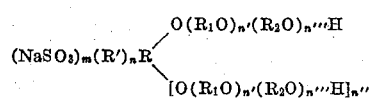

in which the characters have their previous significance, is water soluble, and surface active in an aqueous system except that $n'''$ is a whole number not greater than 2; and with the final proviso that the derivative salt

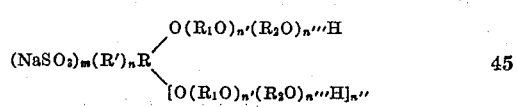

in which the characters have their prior significance, $n'''$ being 15 to 60, is water insoluble and not surface active in an aqueous system.

It has been found that certain phenol-sulfonic acid salts, when subjected to oxyalkylation with an alkylene oxide having at least three and not over four carbon atoms (propylene oxide, butylene oxide, or a mixture of the two), yields a variety of valuable compounds or reaction products.

Generally, the present invention is concerned with oxypropylated or oxybutylated derivatives of certain substituted phenol sulfonic acids and their salts and the method of making the same.

The phenol-sulfonic acid salts employed as initial raw materials are characterized by the fact that as such they must be water-soluble and surface-active. Furthermore, they must be characterized by the fact that, if the phenolic hydroxyl is replaced by the radical $O(R_1O)_2H$ in which $R_1$ represents the radical derived from propylene oxide or butylene oxide, such products still be water soluble; whereas if the value 2 indicated immediately preceding is raised to a higher value, for instance, 15 to 20 up to 40 or 60, the products are no longer water soluble but become soluble in various non-aqueous solvents and particularly hydrocarbon solvents free from an oxygen atom such as aromatic hydrocarbon solvents, aliphatic hydrocarbon solvents, and the like.

The phenols which may be used to produce the initial raw materials of sulfonic salts may have either one or two nuclei. Common examples are the following:

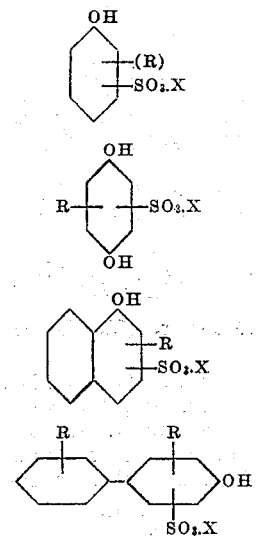

in which X represents sodium, potassium or any cation which, in numerous cases, is non-oxyalkylation-susceptible. As is pointed out subsequently in the text, where the invention is described with greater detail, one may have cations which presumably are oxyalkylation-susceptible such as monoethanol-amine, diethanolamine, triethanolamine, etc. Such cations may be present prior to oxypropylation or oxybutylation provided certain limitations are met or such cation may be introduced afterwards by liberating the free acid and then neutralizing with the selected amine. In the above formula, for the sake of simplicity, as a rule there is only one substituent radical shown in each nuclei. Obviously there may be more than one as, for example, sulfonic acids obtained from diamyl phenol, dinonyl phenol, dodecyl phenol, etc. Other comparable phenol-sulfonic acids are the following, which may or may not have additional substituents:

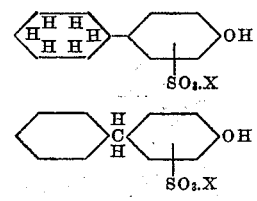

Other phenols which may be used are the following:

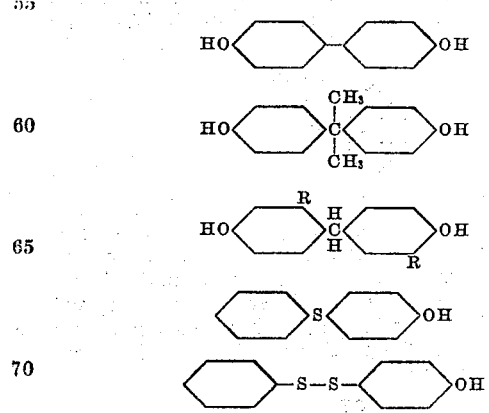

It is to be noted in the latter that the element sulfur appears in the compounds; other than in the sulfonic acid radical.

As to the manufacture of such phenol-sulfonic acids, reference is made to the following patents:

| U. S. Patent No. | Dated | To |
|---|---|---|
| 2,058,504 | Oct. 27, 1936 | Rauschert. |
| 2,107,367 | Feb. 8, 1938 | Bruson. |
| 2,133,287 | Oct. 18, 1938 | Flett. |
| 2,134,711 | Nov. 1, 1938 | Do. |
| 2,134,712 | ----do---- | Do. |
| 2,135,978 | Nov. 8, 1938 | Magoun. |
| 2,145,369 | Jan. 31, 1939 | Osterhof. |
| 2,162,269 | June 13, 1939 | Mikeska. |
| 2,166,136 | July 18, 1939 | Flett. |
| 2,186,132 | Jan. 9, 1940 | Zink. |
| 2,196,985 | Apr. 16, 1940 | Flett. |
| 2,205,946 | June 25, 1940 | Do. |
| 2,205,947 | ----do---- | Do. |
| 2,205,949 | ----do---- | Schwartz. |
| 2,205,957 | ----do---- | Flett. |
| 2,205,958 | ----do---- | Do. |
| 2,213,588 | Sept. 3, 1940 | Mikeska' |
| 2,223,363 | Dec. 3, 1940 | Flett. |
| 2,244,512 | June 3, 1941 | Brandt. |
| 2,249,757 | July 22, 1941 | Flett. |
| 2,256,610 | Sept. 23, 1941 | Buc. |
| 2,267,725 | Dec. 30, 1941 | Flett. |
| 2,283,199 | May 19, 1942 | Do. |
| 2,288,702 | July 7, 1942 | Hentrich et al. |

One class of phenol-sulfonic acid salts included among those above described may be indicated thus $$(R)_n(R_2)(OH)_{n'}$$
$$|$$
$$SO_3 \cdot X$$

in which R is a substituent in an aromatic nucleus, $R_2$ is the phenolic nucleus which has not over 2 aromatic rings, $n$ is a small whole number not over 3 and $n'$ is a small whole number not over 2, and X is the cation. It has been previously pointed out that compounds of the above described must be water soluble and surface active. In some instances the surface activity and the water solubility can be increased by reaction with a modest amount of alkylene oxide such as ethylene oxide, glycide, or methyl glycide which increases certain hydrophile characteristics particularly when R is comparatively large, for instance, 12 to 18 carbon atoms and $n$ represents 2 or 3. Under such circumstances a derivative obtained, for example, by oxyalkylation with 1, 2, 3, 4, or 5 moles of ethylene oxide, may greatly enhance the initial surface activity of the compound in water and yield a more valuable compound when such hydrophile effect is counterbalanced or offset. Such compounds may be indicated thus:

$$(R)_n(R_2)[O(R_3O)_{n''}H]_{n'}$$
$$|$$
$$SO_3 \cdot X$$

in which $R_3O$ is the alkylene oxide radical derived from ethylene oxide, glycide, or methyl glycide and $n''$ is the numeral 1 to 5 and $n'$ has its previous significance.

In any event, the present invention is concerned with water-soluble substituted phenol-sulfonic acid salts or their oxyalkylated derivatives as described with the proviso, (a) that the compounds as such be water-soluble and, (b) furthermore, that when treated with one or two moles of propylene oxide or butylene oxide that the product must still be water soluble and surface active. In other words, the corresponding derivatives in which one or two moles of propylene oxide or butylene oxide enter into the structure of the compound must still be water-soluble and surface-active. Such compounds are designated as $$(R)_n(R_2)[O(R_1O)_{n'}H]_{n'}$$
$$|$$
$$SO_3 \cdot X$$

and $$(R)_n(R_2)[O(R_3O)_{n''}(R_1O)_{n'}H]_{n'}$$
$$|$$
$$SO_3 \cdot X$$

Since the bulk of such sulfonic acid salts are derived from monohydric phenols the presentation is simplified by considering such limited aspect in which the structure of the compound appears as follows:

$$R_n(R_2)O(R_1O)_nH$$
$$|$$
$$SO_3 \cdot X$$

$$R_n(R_2)O(R_3O)_{n''}(R_1O)_{n'}H$$
$$|$$
$$SO_3 \cdot X$$

There is, however, a further proviso that in the previous formulas when $n'$ is replaced by $m$ with the proviso that $m$ be a whole number from 15 to 60 the structures are indicated thus $$(R)_n(R_2)[O(R_1O)_mH]_{n'}$$
$$|$$
$$SO_3 \cdot X$$

and, $$(R)_n(R_2)[O(R_3O)_{n''}(R_1O)_mH]_{n'}$$
$$|$$
$$SO_3 \cdot X$$

$$R_n(R_2)O(R_1O)_mH$$
$$|$$
$$SO_3 \cdot X$$

$$R_n(R_2)O(R_3O)_{n''}(R_1O)_mH$$
$$|$$
$$SO_3 \cdot X$$

and such products must be water-insoluble and must be soluble in a non-oxygenated hydrocarbon solvent.

Actually, as illustrated by certain subsequent examples, there may be more than one sulfonic acid group present and thus the prior formulas may be rewritten to take cognizance of this fact, thus, $$(R)_n(R_2)(OH)_{n'}$$
$$|$$
$$(SO_3 \cdot X)_{n'}$$

$$(R)_n(R_2)[O(R_3O)_{n''}H]_{n'}$$
$$|$$
$$(SO_3 \cdot X)_{n'}$$

$$(R)_n(R_2)[O(R_1O)_{n'}H]_{n'}$$
$$|$$
$$(SO_3 \cdot X)_{n'}$$

$$(R)_n(R_2)[O(R_3O)_{n''}(R_1O)_{n'}H]_{n'}$$
$$|$$
$$(SO_3 \cdot X)_{n'}$$

$$R_n(R_2)O(R_1O)_mH$$
$$|$$
$$(SO_3 \cdot X)_{n'}$$

$$R_n(R_2)O(R_3O)_{n''}(R_1O)_mH$$
$$|$$
$$(SO_3 \cdot X)_{n'}$$

Needless to say, phenol-sulfonic acid salts of the kind specified can be prepared employing conventional procedure and particularly procedures described in the aforementioned list of patents concerned with the manufacture of such salts. If desired, there are some surface active salts available in the open market which may be obtained in the form of dry salts. They include, among others, monobutyl diphenyl sodium monosulfonate. At one time there was, and perhaps still is, on sale in the open market a compound of the kind described as Example 5 in U. S. Patent 2,166,368, dated July 18, 1939, to Flett.

As previously pointed out, the salt can be subjected to reaction with a modest amount of alkylene oxides, which introduce a predominantly hydrophile effect, such as ethylene oxide, glycide and methyl glycide. On the other hand, in most instances the initial step is oxypropylation or oxybutylation for the obvious reason that the selected salt requires no further preliminary reaction. Oxypropylation or oxybutylation can be conducted by any suitable means. One procedure, as described in the aforementioned copending applications, is simply to grind the powder to a very fine state, for instance, 100 to 200 mesh; suspend in an inert solvent along with an added catalyst such as finely powdered caustic soda or sodium methylate, and subject it to the reaction with propylene oxide, butylene oxide, or a mixture of the two. The second procedure involves the use of propylene carbonate or butylene carbonate for the reason that the carbonate eliminates the use of a solvent or, rather, suspending agent; such carbonate acts both as a solvent and an oxyalkylating agent and permits the reduction of a solid to a liquid which can be dispersed more readily in xylene than a solid even though still solvent-insoluble. No novelty is claimed to this step as such, i. e., the use of such alkylene carbonates, and as a matter of fact they can be used for the initial step, i. e., involving ethylene carbonate if such initial step precedes oxypropylation or oxybutylation. Such procedure has been used in connection with a wide variety of other products. For purpose of convenience, the manufacture of compounds using both procedures will be illustrated by Examples 1 to 38.

Oxypropylation or oxybutylation may be conducted intermittently or continuously until the appropriate point is reached. Intermittent oxypropylation or oxybutylation is particularly valuable for exploratory purposes, such as a routine test to determine the approximate degree of oxypropylation or oxybutylation required to convert a water soluble sulfonate of the kind specified into a water insoluble sulfonate which is usually soluble in xylene or in a mixture of xylene and kerosene or, for that matter, in kerosene alone. The equipment suitable for continuous oxypropylation or oxybutylation obviously may be employed in intermittent use. For convenience, reference hereafter will be principally to oxypropylation but obviously this applies also to oxybutylation.

In the particular procedure employed for preparation of the oxypropylated derivatives herein described, the autoclave was of conventional design. It was made of stainless steel and had a capacity of approximately one gallon and a working pressure of one thousand pounds gauge pressure. The autoclave was equipped with the conventional devices and openings, such as the variable stirrer operating at speeds from 50 R. P. M. to 500 R. P. M., thermometer well and thermocouple for mechanical thermometer, emptying outlet; pressure gauge, manual vent line; charge hole for initial reactants; at least one connection for conducting the incoming alkylene oxide, such as ethylene oxide or propylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves are, of course, in essence, small scale replicas of the usual conventional autoclave used in oxyalkylation procedures.

Continuous operation, or substantially continuous operation, is achieved by the use of a separate container to hold the alkylene oxide being employed, such as propylene oxide in the instant procedure. The container consists essentially of a laboratory bomb having a capacity of about one-half gallon, or somewhat in excess thereof. This bomb was equipped, also, with an inlet for charging, and an outlet tube going to the bottom of the container, so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless steel hose or tubing, so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

In the following examples there are illustrated both intermediate and continuous oxypropylation, for the reason that intermediate oxypropylation is a convenient procedure by which exploratory oxypropylations can be made so as to determine initial xylene-solubility. Solubility in xylene, of course, remains as further oxypropylation proceeds and solubility and hydrophobe characteristics may increase to the degree that the product is soluble in solvents, such as a kerosene of little or no aromaticity.

At this point it may be well to point out that the butylene oxide available appears to be a mixture of the three isomers and for all practical purposes reacts as propylene oxide except that the speed of reaction is much slower. In other words, more time, higher temperature, greater pressure and perhaps an increased amount of catalyst may be required.

I have found that it is possible to conduct oxybutylation, particularly in the earlier stages, without too much difficulty although exhaustive oxybutylation may sometimes involve a time factor equal to that comparable to that of oxypropylation. Oxybutylations have been described in the literature comparable to that in connection with oxyethylation or oxypropylation.

*Example 1*

| | Grams |
|---|---|
| Monobutyl phenyl-phenol sodium monosulfonate | 600 |
| Xylene | 600 |
| Sodium methylate | 5 |
| Propylene oxide | 364 |

The powdered sulfonate was placed in the autoclave with 600 grams of xylene and 5 grams of sodium methylate, as indicated. The autoclave was then swept out with nitrogen and sealed. Stirring was started and then heat applied. The temperature was allowed to rise to approximately 170° C. At this point propylene oxide was added to the extent of 364 grams. Notwithstanding the presence of the free hydroxyl radical, oxypropylation took place at a very slow rate. The time required to combine the propylene oxide was 10 hours. The maximum temperature of operation was 175° C. Most of the time the temperature did not drop much below 170° C. The maximum pressure was 160 pounds per square inch. The product at this stage on a xylene-free basis calculated as follows:

| | Percent |
|---|---|
| Sulfonate | 62.4 |
| Propylene oxide | 37.6 | and on a xylene-containing basis calculated as follows:

| | Percent |
|---|---|
| Sulfonate | 38.4 |
| Propylene oxide | 23.2 |
| Xylene | 38.4 |

*Example 2*

The autoclave was drained so as to permit 812 grams of the reaction mixture to stay in the autoclave. This was equivalent to 312 grams of the sulfonate, 188 grams of propylene oxide, and 312 grams of xylene. The sodium methylate previously added was ignored for purpose of calculation. 2½ grams of sodium methylate were added to the mixture and the autoclave flushed out with nitrogen, as before, and oxypropylation resumed. 290 grams of propylene oxide were added during this step. The time required was 3 hours, with a maximum temperature of 175° C., and a maximum pressure of 180 pounds per square inch. The composition corresponded to the following, on a xylene-free basis:

| | Percent |
|---|---|
| Sulfonate | 39.4 |
| Propylene oxide | 60.6 |

On a xylene-containing basis it was calculated as follows:

| | Percent |
|---|---|
| Sulfonate | 28.3 |
| Propylene oxide | 43.4 |
| Xylene | 28.3 |

*Example 3*

The autoclave was again drained slightly so as to leave 675 grams of the mixture identified as Example 2, preceding, in the autoclave. This corresponded to 191 grams of xylene. This mixture was subjected to a third oxypropylation step, in which the time required was 3 hours, the maximum temperature 170° C., and the maximum pressure 220 pounds per square inch. The product so obtained on a xylene-free basis corresponded to the following composition:

| | Percent |
|---|---|
| Sulfonate | 24.4 |
| Propylene oxide | 75.6 |

On a xylene-containing basis it was calculated as follows:

| | Percent |
|---|---|
| Sulfonate | 19.6 |
| Propylene oxide | 60.8 |
| Xylene | 19.6 |

This particular product was xylene-soluble, whereas, the intermediate products were merely dispersible when subjected to mechanical agitation. When xylene was evaporated from the mixture, it was a sticky, amber-colored, very viscous liquid. Needless to say, this product dissolved in xylene and other comparable aromatic solvents. It was not soluble in non-aromatic kerosene. It was somewhat water-emulsifiable, but not nearly as water-soluble as the original sulfonate. Possibly a very small portion was water-soluble, but the large percentage—90% or more—was water-insoluble. It proved to be a particularly valuable coupling agent in the preparation of emulsions, where the emulsifying agent itself was the original sulfonate, or monobutyl diphenyl sodium monosulfonate. It was soluble to the extent of 1% or 2% in some typical lubricating oils which contained approximately 10% to 15% of additives, the bulk of which additives were alkaline earth soaps, mahogany sulfonates, or similar materials. If propylene oxide is replaced by butylene oxide, in either weight or molar ratio, the products are completely water-insoluble. The same can be accomplished by a 50:50 mixture of the two oxides.

*Example 4*

| | Grams |
|---|---|
| Monobutyl phenyl-phenol sodium monosulfonate | 600 |
| Xylene | 600 |
| Sodium methylate | 10 |
| Propylene oxide | 1,800 |

The procedure followed was the same as in Example 1, preceding, except that oxypropylation was a continuous process involving a single step. The time required was somewhat less than the interrupted procedures, being a total of 12 hours. The maximum temperature employed was 175° C., and the maximum pressure was 200 pounds per square inch. The final product was comparable to Example 3 containing, roughly, one part of sulfonate, two parts of propylene oxide and one part of xylene. See what was said in regard to the use of butylene oxide in the prior example. This applies here also.

*Example 5*

The same procedure was followed, but using monoamylphenylphenol sodium sulfonate and employing the same procedure as in Example 4, immediately preceding.

*Example 6*

The same procedure was followed, but using monohexylphenylphenol sodium sulfonate and employing the same procedure as in Example 4, preceding.

*Example 7*

The same procedure was followed, but using diamylphenylphenol sodium sulfonate and employing the same procedure as in Example 4, preceding.

*Example 8*

Examples 4 to 7 were repeated but the amount of sulfonate employed in each instance was 500 grams instead of 600 grams. The amount of sodium methylate employed was reduced from 10 grams to 9 grams. The amount of xylene employed was the same as previously.

*Example 9*

The same procedure was followed as in Examples 4 to 8, inclusive, except that the amount of sulfonate employed was reduced to 450 grams and the amount of sodium methylate reduced to 8 grams. In all other respects the oxypropylation procedure was the same as previously described. In any of these examples, or similar examples, invariably water insolubility increases, i. e., the products become less soluble in water, and hydrocarbon solubility increases. This is particularly true in respect to non-aromatic kerosene and especially butylene oxide if it is used, at least in part or entirely, to replace propylene oxide.

The xylene, which is used as a suspending agent in the above experiments, can be replaced by any other suitable non-reactive solvent, such as mesitylene, cymene, decalin, or the like. Xylene has the advantage of being cheap, readily available, and can be removed from the finished product by distillation, and particularly vacuum distillation. The use of such solvent, or, rather, suspending agent, at least in the initial stage, and particularly xylene, has the added advantage insofar that it practically indicates the end point, or, at least, the initial end point, i. e., the degree of oxypropylation or oxybutylation where the product is xylene-soluble. If batchwise oxypropylation or oxybutylation is being employed, or if continuous oxypropylation or oxybutylation is being employed and one takes samples intermittently, obviously mere casual examination indicates when the xylene-containing mixture is homogenous, and usually, this also applies for a more dilute sample. In other words, the finished sample can then be diluted so as to contain 5% or less of the oxypropylation product, or oxybutylation product, and the remainder xylene. When such point is reached, at least the stage of initial xylene-solubility has been determined. Sometimes samples exhibit xylene-solubility in concentrated solutions, but require further oxypropylation or oxybutylation to make them xylene-soluble in dilute solutions, for instance, 2% to 5% of the oxyalkylation derivative. Solution in a non-aromatic hydrocarbon may require at least partial use of butylene oxide.

*Example 10*

| | Grams |
|---|---|
| Phenol monosulfonate sodium salt produced in the manner described in Example 5 of aforementioned U. S. Patent No. 2,166,136 | 300 |
| Xylene | 300 |
| Sodium methylate | 6 |
| Propylene oxide | 300 |

The powdered sulfonate was placed in an autoclave with 300 grams of xylene and 6 grams of sodium methylate, as indicated. The autoclave was then swept out with nitrogen and sealed. Stirring was started and then heat applied. The temperature was allowed to rise to approximately 175° C. At this point propylene oxide was added to the extent of 300 grams. Notwithstanding the presence of the free hydroxyl radical, oxypropylation took place rather slowly. The time required to combine the propylene oxide was 3¾ hours. At no time did the temperature go above the initial temperature of 175° C. Likewise, the temperature did not drop much below 170° C. at any time. The maximum pressure was 170 pounds per square inch. The product at this stage, on a xylene-free basis, calculated as follows:

| | Percent |
|---|---|
| Sulfonate | 50.0 |
| Propylene oxide | 50.0 |

On a xylene-containing basis it calculated as follows:

| | Percent |
|---|---|
| Sulfonate | 33.3 |
| Propylene oxide | 33.3 |
| Xylene | 33.4 |

An examination of this product, both on a xylene-containing basis and after evaporation of xylene, did not show any marked change in solubility, although water-solubility apparently was decreased to at least some degree.

*Example 11*

The reaction mass above indicated, except for the small amount of sample withdrawn, was subjected to further oxypropylation in the manner previously indicated. Without the addition of more catalyst, a second 300-gram portion of propylene oxide was added. The reaction time was longer than before, being 5 hours. This reaction took place under substantially the same conditions as previously, i. e., temperature range of 168° C. to 178° C., and maximum pressure of 182 pounds per square inch. The composition, on a xylene-free basis, was as follows:

| | Percent |
|---|---|
| Sulfonate | 33.3 |
| Propylene oxide | 67.0 |

On a xylene-containing basis, it was calculated as follows:

| | Percent |
|---|---|
| Sulfonate | 25 |
| Xylene | 25 |
| Propylene oxide | 50 |

At the end of the second addition of propylene oxide the product showed solubility in a mixture of 65% xylene and 35% non-aromatic kerosene. The product, even when the xylene had been evaporated, showed less solubility in water than in the instance of Example 10, preceding. There was an unquestionable reduction on hydrophile character and an increase in hydrophobe character.

*Example 12*

A third portion of propylene oxide (300 grams) was added as before, after the autoclave had been opened and 7 grams of sodium methylate added. After the addition of methylate the autoclave was swept out with nitrogen gas as before; otherwise, the procedure, as far as temperature and pressure were concerned, was the same as in Examples 10 and 11, preceding, i. e., the temperature range was within the limit of 167° C. to 180° C., and the pressure varied from 170 to 187 pounds per square inch. The time required was less than previously, apparently due to the addition of sodium methylate, and was 2½ hours. At the end of this time a sample showed a continued change in solubility character, i. e., it seemed to be even less water-soluble or dispersible than before, but was soluble in a mixture of 50% xylene and 50% non-aromatic kerosene. The product itself, on a xylene-free basis, represented 25% sulfonate and 75% propylene oxide. On a xylene-containing basis it represented 20% sulfonate, 20% xylene and 50% propylene oxide.

*Example 13*

A final and last addition of propylene oxide was made to the above reaction mass. The amount added was 300 grams. No more catalyst was added. The temperature and pressure range were within the same limits, as in Example 12, preceding. The time required, however, was somewhat longer, i. e., 3¾ hours. The product, on a xylene-free basis, was water-dispersible and did not show much difference in this property compared with the previous sample. However, it was soluble in a mixture of 65 parts of non-aromatic kerosene and 35 parts of xylene and practically dissolved in a mixture of 75% non-aromatic kerosene and 25% xylene. The product, when free from xylene, was a thick, viscous, amber-colored liquid.

Calculated on a xylene-free basis, the product represented 20% sulfonate and 80% propylene oxide. On a xylene-containing basis, it represented 16.6% sulfonate, 66.8% propylene oxide, and 16.6% xylene.

In the above calculation and in previous calculations, no cognizance was taken of the presence of sodium methylate, except as far as weight percentages were concerned, and no cognizance was taken of the fact that small samples of 2 or 3 grams were taken out at the end of intermediate oxypropylations for examination.

Needless to say, this product dissolves in xylene and other comparable aromatic solvents. It proved to be a particularly valuable coupling agent in the preparation of emulsions where the emulsifying agent was the original sulfonate itself. It was soluble to the extent of 1% or 2%, and probably to a greater degree in some typical lubricating oils which contained approximately 10% to 15% of additives. The bulk of these additives were alkaline earth soaps, mahogany sulfonates, or similar materials. When butylene oxide replaced propylene oxide (gram for gram) the product became water-insoluble at an earlier stage. This final product then was soluble in 50:50 mixture of xylene and non-aromatic kerosene.

*Example 14*

| | Grams |
|---|---|
| Sulfonate as described in Exampe 10 | 300 |
| Xylene | 300 |
| Sodium methylate | 10 |
| Propylene oxide | 1,200 |

The procedure followed was the same as in Example 10, preceding, except that oxypropylation was a continuous process involving a single step. The time required was somewhat less than in the interrupted procedures, being a total of 11¼ hours. The maximum temperature employed was 178° C., and the maximum pressure was 205 pounds per square inch. The final product was comparable in every respect to the one described as the end product in Example 13, preceding. Replacing 1200 grams of propylene oxide by 1650 grams of butylene oxide gave a product completely soluble in non-aromatic kerosene.

*Example 15*

| | Grams |
|---|---|
| Sulfonate as described in Example 4 of aforementioned U. S. Patent 2,166,136 | 300 |
| Xylene | 300 |
| Sodium methylate | 10 |
| Propylene oxide | 1,200 |

The procedure followed was the same as that described in Example 14, preceding, and the solubility characteristics of the final product were substantially the same as in the preceding example.

*Example 16*

| | Grams |
|---|---|
| Sulfonate as described in Example 6 of aforementioned U. S. Patent 2,166,136 | 300 |
| Xylene | 300 |
| Sodium methylate | 10 |
| Propylene oxide | 1,200 |

The procedure followed was the same as that described in Example 14, preceding, and the solubility characteristics of the final product were substantially the same as in the preceding example.

*Example 17*

| | Grams |
|---|---|
| Sulfonate as described in Example 1 of aforementioned U. S. Patent 2,223,363 | 300 |
| Xylene | 300 |
| Sodium methylate | 10 |
| Propylene oxide | 1,200 |

The procedure followed was the same as that described in Example 14, preceding, and the solubility characteristics of the final product were substantially the same as in the preceding example.

Example 18

|  | Grams |
|---|---|
| Mono-sulfonated product prepared in the manner described in the first example of U. S. Patent 2,135,978, employing 400 parts of fuming sulfuric acid (15% sulfur trioxide) instead of 880 parts of fuming sulfuric acid (21% sulfur trioxide) so as to yield a monosulfonate instead of a polysulfonate | 300 |
| Xylene | 300 |
| Sodium methylate | 10 |
| Propylene oxide | 1,200 |

The procedure followed was the same as that described in Example 14, preceding, and the solubility characteristics of the final product were substantially the same as in the preceding example.

The product above described is essentially a polybutylated phenyl phenol monosulfonic acid sodium salt. Equally satisfactory are polyamylated phenyl phenol monosulfonic acid sodium salt, or polyhexylated phenyl phenol monosulfonic acid sodium salt. Similarly, one may employ a polyoctylated phenyl phenol monosulfonic acid sodium salt, or the polydecylated phenyl phenol monosulfonic acid sodium salt.

Example 19

|  | Grams |
|---|---|
| Tributylated phenylphenol disulfonic acid sodium salt | 300 |
| Xylene | 300 |
| Sodium methylate | 6 |
| Propylene oxide | 300 |

The powdered sulfonate was placed in the autoclave with 300 grams of xylene and 6 grams of sodium methylate, as indicated. The autoclave was then swept out with nitrogen and sealed. Stirring was started and heat applied. The temperature was allowed to rise to 185° C. At this point propylene oxide was added to the extent of 300 grams. Notwithstanding the presence of the free hydroxyl radical, oxypropylation took place rather slowly. The time required to combine the propylene oxide was 6¾ hours. At no time did the temperature go above 185° C. Likewise, the temperature did not drop below 168° C. at any time. The maximum operating pressure was 178 pounds per square inch. The product at this stage, on a xylene-free basis, calculated as follows:

|  | Percent |
|---|---|
| Sulfonate | 50.0 |
| Propylene oxide | 50.0 |

On an xylene-containing basis, it calculated as follows:

|  | Percent |
|---|---|
| Sulfonate | 33.3 |
| Propylene oxide | 33.3 |
| Xylene | 33.4 |

An examination of this product, both on a xylene-containing basis and after evaporation of xylene, did not show any marked change in solubility, although water-solubility apparently was decreased to at least some degree.

Example 20

The reaction mass above indicated, except for the small amount of sample withdrawn, was subjected to further oxypropylation in the manner previously indicated. Without the addition of more catalyst, a second 300-gram portion of propylene oxide was added. The reaction time was slightly longer than before, being 7½ hours. The reaction took place under substantially the same conditions as previously, i. e., a temperature range of 171° C. to 183° C., and a maximum pressure of 175 pounds per square inch. The composition, on a xylene-free basis, was as follows:

|  | Percent |
|---|---|
| Sulfonate | 33 |
| Propylene oxide | 67.0 |

On a xylene-containing basis it was calculated as follows:

|  | Percent |
|---|---|
| Sulfonate | 25 |
| Xylene | 25 |
| Propylene oxide | 50 |

At the end of the second addition of propylene oxide, the product showed solubility in a mixture of 65% xylene and 33% non-aromatic kerosene. The product, even when the xylene had been evaporated, showed less solubility in water than in the instance of Example 19, preceding. There was an unquestionable reduction in hydrophile character and an increase in hydrophobe character.

Example 21

A third portion of propylene oxide (300 grams) was added as before; after the autoclave had been opened 8 grams of sodium methylate were added. After the addition of the methylate, the autoclave was swept out with nitrogen gas as before. Otherwise, the procedure, as far as temperature and pressure were concerned, was the same as in Example 19, preceding, i. e., the temperature range was within the limit of 175° C. to 186° C., and the pressure varied from 169 to 180 pounds per square inch. The time required was less than previously, apparently due to the added catalyst, and was slightly less than 6½ hours. At the end of this time a sample showed a continued change in solubility character, i. e., it seemed to be even less water-soluble or dispersible than before, but was soluble in a mixture of 50% xylene and 50% non-aromatic kerosene. The product itself, on a xylene-free basis, represented 25% sulfonate and 75% propylene oxide. On a xylene-containing basis, it represented 20% sulfonate, 20% xylene and 50% propylene oxide.

Example 22

A further addition of propylene oxide was made to the above reaction mass. The amount added was 300 grams. No more catalyst was added. The temperature and pressure ranges were within the same limits as in Example 21, preceding. The time required was approximately the same, to wit, 7½ hours. The product, on a xylene-free basis, was still water-dispersible to a degree and did not show too much difference in this property compared with the previous example. At this point the product showed some solubility in a mixture of kerosene and xylene, but was not soluble in a mixture containing 65 parts of non-aromatic kerosene and 35 parts of xylene.

Calculated on a xylene-free basis, the product represented 20% sulfonate and 80% propylene oxide. On a xylene-containing basis it represented 16.6% sulfonate, 66.8% propylene oxide, and 16.6% xylene.

Example 23

The same procedure was followed for all practical purposes, as in the four preceding examples, with the addition of another 300 grams of propylene oxide, along with 8 grams of sodium methylate. The time, temperature range, and pressure range were substantially the same as in the preceding examples; to wit, time of 12¾ hours maximum, and a pressure of 190 pounds maximum. At the end of this addition of propylene oxide the product, on a xylene-free basis, represented one-sixth sulfonate and five-sixths propylene oxide. The product was soluble in approximately a fifty-fifty mixture of non-aromatic kerosene and xylene and showed even less solubility in water than the previous example.

Example 24

Without the addition of any more catalyst, the above reaction was given final treatment with another 300 grams of propylene oxide. The final product, on a xylene-free basis, represented one-seventh sulfonate and six-sevenths propylene oxide. The product was soluble in a mixture of two-thirds non-aromatic kerosene and one-third xylene. When freed from the small amount of xylene present and shaken up with water, it gave a cloudy suspension which tended to oil out of solution, showing extremely limited hydrophile properties. The temperature and pressure range was approximately the same as in the last three examples, preceding. The time period was the longest in the series—being 16 hours.

In the above calculation and in previous calculations, no cognizance was taken of the presence of sodium methylate, except as far as weight percentages were concerned, and no cognizance was taken of the fact that small samples of 2 or 3 grams were taken out at the end of intermediate oxypropylations for examination.

As pointed out, this product dissolved in a mixture of two-thirds non-aromatic kerosene and one-third xylene, proved to be a particularly valuable agent in the preparation of emulsions, where the emulsifying agent was the original sulfonate itself. It was soluble to the extent of 1% or 2%, and probably to a greater degree in some typical lubricating oils which contained approximately 10% to 15% of additives. The bulk of these additives were alkaline earth soaps, mahogany sulfonates, or similar materials.

Example 25

| | Grams |
|---|---|
| Sulfonate, as described in Example 19 | 300 |
| Xylene | 300 |
| Sodium methylate | 17.5 |
| Propylene oxide | 1,800 |

The procedure followed was the same as in Example 19, preceding, except that oxypropylation was a continuous process involving a single step. The time required was somewhat less than in the interrupted procedures, being a total of approximately 48 hours. The maximum temperature employed was 183° C., and the maximum pressure was 202 pounds per square inch. The final product was comparable in every respect to the one described as the end product in Example 24, preceding.

Example 26

| | Grams |
|---|---|
| Triamylated phenylphenol disulfonic acid sodium salt | 300 |
| Xylene | 300 |
| Sodium methylate | 17.5 |
| Propylene oxide | 1,200 |

The procedure followed was the same as that described in Example 25, preceding, and the solubility characteristics of the final product were substantially the same as in the preceding example.

Example 27

| | Grams |
|---|---|
| Trihexylated phenylphenol disulfonic acid sodium salt | 300 |
| Xylene | 300 |
| Sodium methylate | 17.5 |
| Propylene oxide | 1,200 |

The procedure followed was the same as that described in Example 25, preceding, and the solubility characteristics of the final product were substantially the same as in the preceding sample.

Example 28

| | Grams |
|---|---|
| Trioctylated phenylphenol disulfonic acid sodium salt | 300 |
| Xylene | 300 |
| Sodium methylate | 17.5 |
| Propylene oxide | 1,200 |

The procedure was the same as that described in Example 25, preceding. The solubility characteristics of the final product were substantially the same as in the preceding example.

Example 29

| | Grams |
|---|---|
| Tridecylated phenylphenol disulfonic acid sodium salt | 300 |
| Xylene | 300 |
| Sodium methylate | 17.5 |
| Propylene oxide | 1,200 |

The procedure followed was the same as that described in Example 25, preceding. The solubility characteristics of the final product were substantially the same as in the preceding example.

Example 30

| | Grams |
|---|---|
| Monobutyl phenylphenol sodium monosulfonate | 320 |
| Propylene carbonate | 2,640 |
| Potassium carbonate | 45 |

The powdered sulfonate, together with other reactants, was placed in a glass flask and heated to approximately 120° C. and kept at this temperature for hours. The temperature was then raised to 180° C. and held at this higher temperature for 8 hours. At the end of this period of time the weight indicated a loss of all the $CO_2$ originally present in the propylene carbonate. The residual oxypropylated material was water-insoluble but soluble in hydrocarbon solvents, particularly xylene or a mixture of half xylene and half kerosene.

Example 31

The procedure of Example 30 was repeated and at the completion of the oxypropylation by means of propylene carbonate the product was removed as a viscous liquid to a small autoclave and 1% of finely powdered caustic soda was added. The product was then subjected to reaction with 560 grams of propylene oxide. The product so obtained showed no appreciable solubility in water and was soluble in approximately 65 parts of kerosene and 35 parts of xylene. For all practical purposes, the oxypropylation procedure was conducted in the manner described in Example 1, preceding.

Example 32

The procedure outlined in Example 31, preceding, was repeated except that 700 grams of butylene oxide (mixed isomers) was substituted for the 560 grams of propylene oxide employed in the preceding example.

Example 33

The procedure of Example 30 was repeated employing 432 grams of dibutylated phenylphenol disulfonic acid sodium salt instead of 320 grams of monobutylated phenylphenol monosulfonic sodium salt as in Example 30, preceding.

Example 34

The Example 33 preceding is repeated except that the product was reacted further with propylene oxide in the same manner as described in Example 31, preceding.

Example 35

The same procedure was followed as in Example 32, preceding, except that the product subjected to reaction with butylene oxide is the product derived by the procedure outlined in Example 33 instead of Example 30, preceding.

Example 36

The same procedure was followed as in Example 30, preceding, except that the sulfonate employed was one having a molecular weight of approximately 370 as prepared and described in Example 6 of the aforementioned U. S. patent, 2,166,136. 370 grams of sulfonate (sodium salt) was used instead of the 320 grams of the particular sulfonate employed. In all other respects the procedure was the same.

Example 37

The same procedure was employed in all respects as described in Example 31, preceding, except that the reaction mass subjected to further reaction with propylene oxide was the one described under Example 35, preceding, instead of the one described in Example 30, preceding.

Example 38

The same procedure was employed as in Example 32, preceding, except that the reaction mass subjected to oxybutylation was the one described under Example 36, preceding, instead of the one described in Example 30, preceding.

It is to be noted that if propylene oxide is replaced completely by butylene oxide, mole for mole, there is a very definite decrease in water solubility or hydrophile character and a very marked increase in hydrocarbon solubility or hydrophobe effect. Indeed, this is true as a rule if propylene oxide is replaced merely weight for weight by butylene oxide, or partially replaced by butylene oxide. All that is required is conformity to the minimum of fifteen moles of oxide as specified in previous descriptions.

In connection with a series of typical oxyalkylations involving primarily phenol sulfonic acid salts which are readily available, or can be readily prepared, and particularly derivatives of alkylated phenyl phenols, some solubility data has been tabulated for convenience in order to emphasize the novel features of the present invention.

TABLE I

| Ex. No. | Sulfonate used as Na salt is one shown as starting mtl. in Ex. No. | Molar ratio of added EtO if any | Water solubility | | | | | Xylene solubility | | | | |
|---|---|---|---|---|---|---|---|---|---|---|---|---|
| | | | 2 moles PrO per mole sulfonate | 2 moles BuO per mole sulfonate | 15 moles PrO per mole sulfonate | 20 moles PrO per mole sulfonate | 15 moles BuO per mole sulfonate | 2 moles PrO per mole sulfonate | 2 moles BuO per mole sulfonate | 15 moles PrO per mole sulfonate | 20 moles PrO per mole sulfonate | 15 moles BuO per mole sulfonate |
| 1A | 1 | None | S | S | D | I | I | I | I | D | S | S |
| 2A | 5 | None | S | S | D | I | I | I | I | D | S | S |
| 3A | 6 | None | S | S | D | I | I | I | I | D | S | S |
| 4A | 7 | None | S | S | D | I | I | I | I | D | S | S |
| 5A | 10 | None | S | S | D | I | I | I | I | D | S | S |
| 6A | 19 | None | S | S | S | D | D | I | I | D | S | S |
| 7A | 26 | None | S | S | S | D | D | I | I | D | S | S |
| 8A | 27 | None | S | S | S | D | D | I | I | D | S | S |
| 9A | 28 | None | S | S | S | D | D | I | I | D | S | S |
| 10A | 29 | None | S | S | S | D | D | I | I | D | S | S |
| 11A | 1 | 1:1 | S | S | S | D | D | I | I | I | S | S |
| 12A | 5 | 1:1 | S | S | S | D | D | I | I | I | S | S |
| 13A | 6 | 1:1 | S | S | S | D | D | I | I | I | S | S |
| 14A | 7 | 1:1 | S | S | S | D | D | I | I | I | S | S |

S=Soluble, usually clearly soluble or a non-separating dispersion.
D=somewhat dispersible or dispersible, generally having present considerable insoluble material which separates out rapidly on standing.
I=insoluble; that is, dispersible only while shaking but separates almost completely when agitation stops.

TABLE II

| Ex. No. | Monosulfonic acid from— | Gms. sulfonic acid | Dissolved or mixed with gms. xylene | Neutralized with— | Gms. of base |
|---|---|---|---|---|---|
| 1C | 2,4-diamyl phenol, mol. wt. 314 | 500 | 500 | 28% NH₄OH | 91 |
| 2C | do | 500 | 500 | NaOH in 75 gm. H₂O | 60 |
| 3C | do | 500 | 500 | TEA | 237 |
| 4C | do | 500 | 500 | Triethylamine | 151 |
| 5C | Dinonyl phenol, mol. wt. 426 | 500 | 500 | 28% NH₄OH | 65 |
| 6C | do | 500 | 500 | NaOH in 50 gms. H₂O | 42 |
| 7C | do | 500 | 500 | TEA | 168 |
| 8C | do | 500 | 500 | Triethylamine | 107 |
| 9C | Di-sec. butyl phenol, mol. wt. 286 | 500 | 500 | 28% NH₄OH | 108 |
| 10C | do | 500 | 500 | NaOH in 75 gms. H₂O | 71.3 |
| 11C | do | 500 | 500 | TEA | 265.5 |
| 12C | do | 500 | 500 | Triethylamine | 180 |
| 13C | Tetradecyl phenol, mol. wt. 370 | 400 | 400 | 28% NH₄OH | 62 |
| 14C | do | 400 | 400 | NaOH in 40 gms. H₂O | 40.7 |
| 15C | do | 400 | 400 | TEA | 151 |
| 16C | do | 400 | 400 | Triethylamine | 103 |

TEA=triethanolamine.

TABLE III

| Ex. No. | Sulfonate used as Na salt is one shown as starting mtl. in Ex. No. | Molar ratio of added EtO if any | Water solubility | | | | | Xylene solubility | | | | |
|---|---|---|---|---|---|---|---|---|---|---|---|---|
| | | | 2 moles PrO per mole sulfonate | 2 moles BuO per mole sulfonate | 15 moles PrO per mole sulfonate | 20 moles PrO per mole sulfonate | 15 moles BuO per mole sulfonate | 2 moles PrO per mole sulfonate | 2 moles BuO per mole sulfonate | 15 moles PrO per mole sulfonate | 20 moles PrO per mole sulfonate | 15 moles BuO per mole sulfonate |
| 1B | 1C | None | S | S | S | I | I | I | I | I | S | S |
| 2B | 2C | None | S | S | S | I | I | I | I | I | S | S |
| 3B | 3C | None | S | S | S | D | D | I | I | I | D | D |
| 4B | 4C | None | S | S | S | D | D | I | I | I | D | D |
| 5B | 5C | None | S | S | S | I | I | I | I | I | S | S |
| 6B | 6C | None | S | S | S | I | I | I | I | I | S | S |
| 7B | 7C | None | S | S | S | D | D | I | I | I | D | D |
| 8B | 8C | None | S | S | S | D | D | I | I | I | D | D |
| 9B | 9C | None | S | S | S | I | I | I | I | I | S | S |
| 10B | 10C | None | S | S | S | I | I | I | I | I | S | S |
| 11B | 11C | None | S | S | S | D | D | I | I | I | D | D |
| 12B | 12C | None | S | S | S | D | D | I | I | I | D | D |
| 13B | 13C | None | S | S | S | I | I | I | I | I | S | S |
| 14B | 14C | None | S | S | S | I | I | I | I | I | S | S |
| 15B | 15C | None | S | S | S | D | D | I | I | I | D | D |
| 16B | 16C | None | S | S | S | D | D | I | I | I | D | D |

For explanation of S, D, and I, see Table I.

Elsewhere it has been pointed out that when a product such as a phenol sulfonic acid salt as herein described is reacted with 15 moles or 20 moles of an oxide, such as propylene oxide or butylene oxide, one does not obtain a product having exclusively 15 or 20 moles but, for example, in the latter case, obtains a cogeneric mixture, the bulk of which may have 20 moles of oxide or approximately 20 moles, yet some of the members of the mixture may have as few as 15 moles or less and sometimes as many as 25 or more.

Obviously, in the lower boundaries one obtains mixtures, part of which are water-soluble and part water-insoluble. Note what is said at the bottom of Table I in explaining such properties.

One can mix such cogeneric mixture with 1 to 5 times its weight of water at ordinary temperatures and allow a separation to take place within a few hours or to 24 hours. The insoluble layer can be withdrawn as meeting the specified characteristics. The aqueous layer can be withdrawn, water eliminated in the conventional manner by spray drying or vacuum distillation, and the residual product again subjected to further treatment with propylene oxide or butylene oxide as required.

The layer which separates, although being water-insoluble, may contain some dissolved water. Such material can be rendered anhydrous in the usual manner, i. e., spray drying, vacuum distillation or using a phase-separating trap along with a water-insoluble solvent such as xylene. Also, it is obvious that the presence of an inert solvent used as a suspending agent such as xylene, of course, may affect water solubility in so far as the layer which separates out might represent a mixture of the oxyalkylated derivative plus xylene. If need be, the xylene may be eliminated by evaporation or vacuum distillation and then the solubility separation noted above be employed in connection with the solvent-free material.

For many purposes, mixtures obtained which contain both water-soluble members and water-insoluble members have special utility in the preparation of emulsions or as additives in the preparation of emulsions.

In light of what is said elsewhere in regard to the amine salts and also in light of the limits included in the claims, it is obvious that in many cases it is desirable to prepare not only amine salts but also sodium salts as exemplified by Tables I and III. In such instances, the solubility of the sodium salts is the determining factor in deciding whether or not the product obtained is sufficiently oxyalkylated with propylene oxide or butylene oxide to come within the meets and bounds of the invention. All of this is perfectly obvious in what appears elsewhere and particularly in light of the specific restrictions in the hereto appended claims.

For many purposes, the sodium salt is suitable and most economical to prepare. However, as far as the sulfonic acid is concerned, it may be in combination with various cations, as hereinafter described. For the sake of simplicity, the invention will be described primarily from the standpoint of a sodium or potassium salt, particularly the former.

Regardless of what the cation happens to be, however, the sulfonic acid, prior to oxypropylation or oxybutylation, must be characterized by the fact that the sodium salt is usually xylene-insoluble, and that after oxypropylation or oxybutylation, the sodium salt may be soluble in kerosene or a mixture of xylene and kerosene. Butylene oxide is apt to render the sodium salt xylene-soluble.

In an important and restricted sense the present invention is concerned with treating a water-soluble, often xylene-insoluble sodium salt of a substituted phenol-sulfonic acid with propylene oxide or butylene oxide so as to reduce greatly its water-solubility and make the resultant compound, or compounds, soluble in xylene or comparable hydrocarbon solvents. Such xylene-soluble salts, and particularly the sodium salts, are valuable as additives in the preparation of emulsions. Extremely dilute emulsions, for instance, those in which the dispersed phase is less than two-tenths of a percent, and usually less than one-tenth of a percent, have been prepared without using an emulsifying agent. The majority of emulsions, however, are prepared by the use of an emulsifying agent, and thus, the emulsion system consists essentially of three ingredients. However, many technical emulsions actually have a fourth ingredient, which may be an emulsifier of indifferent or inferior effect, but is valuable, because it is a coupling agent or mutual solvent. See "The Composition and Structure of Technical Emulsions," J. H. Goodey, Royal Australian Chem. J. and Proc., 16, 1949, pp. 47–75.

Another use for the products herein described is an additive for lubricating oils, particularly petroleum lubricating oils, to give added detersive qualities, and hence, other desirable characteristics. Needless to say, the compounds herein described having a terminal hydroxyl group, can be reacted with various reagents, such as acids, imines, alkylene oxides other than propylene oxide, and the like, to give further derivatives of distinct value. When treated with one mole or several moles of styrene oxide (phenyl ethylene oxide), one obtains extremely valuable additives for various lubricating oils. There are available a large number of phenols which can be converted into sulfonic acids, and then into the corresponding sodium salt. As previously indicated, the particular one selected as a starting material for the present purpose is one which is completely water-soluble in dilute solution but is xylene-insoluble. Phenols available in the open market and of utility for the present use, include those in which alkyl radicals having 4 to 10 carbon atoms have been introduced in the phenol nucleus. In other classes a cyclic group may be introduced as in the case of phenyl phenol, methyl phenol, various terpene-substituted phenols, etc.

The selection of phenol or phenol sulfonate, as such, is perfectly simple. The sodium salt, and usually a mono-sulfonate, freed from inorganic salts, if present, and from any other extraneous material, is simply examined to see if it is water-soluble so as to give a 1% to 5% solution in water at ordinary temperature, approximately 20°–25° C. A dilute solution, for example, .1% to 1%, is examined to see that it is surface-active in the usual sense, i. e., foams, emulsifies, lowers surface tension of water, etc., under the same conditions as it is examined for xylene-solubility. Preferably, the xylene-solubility should be practically nil (less than 1/10 to 2/10 percent) at ordinary temperature. Such simple test will readily indicate if it is perfectly suitable for use in preparing the herein described oxypropylated or oxybutylated derivatives. If xylene-soluble one may proceed, or if desired ethylene oxide or glycide may be employed, to decrease xylene solubility or increase water solubility or increase surface-active properties.

The product is then subjected to oxypropylation or oxybutylation, using an amount of propylene oxide or butylene oxide at least equal to one-third or two-thirds mole of propylene oxide or butylene oxide for each carbon atom present in the phenol sulfonate. If this amount of propylene oxide or butylene oxide does not give water insolubility, the process is continued until the amount of propylene oxide or butylene oxide added in molar amount is twice or three times the number of carbon atoms present in the phenol sulfonate. If, at this stage the resultant product is not water-insoluble, more can be employed. In any event, if 60 moles of butylene oxide per phenolic hydroxyl does produce water insolubility, it is considered unsatisfactory for the reason that prohibitive amounts of propylene oxide or butylene oxide would be required. Suitable phenols have been previously indicated, and include, among others, diamylphenol, mono-phenol, and particularly phenylphenols, which are most suitably obtained by the alkylation of orthohydroxydiphenyl with a suitable alcohol under conditions so as to yield a monosulfonate. As alkylating agents, the various aliphatic alcohols, as, for example, primary, secondary, or tertiary butyl alcohols, with straight or branched chain, such as n-butyl alcohol, methyl ethyl carbinol, trimethyl carbinol, n-amyl alcohol, isoamyl alcohol, propyl alcohol, ethyl alcohol, octyl alcohol, decyl alcohol, and the like, may be brought into action on the initial material, and they may be employed as such, or in the form of their esters, such as the alkyl sulfates.

In light of the variety of phenol sulfonates that may be employed, it is obvious that, in a general way, as the number of carbon atoms in the substituent group or groups goes up, less propylene oxide or butylene oxide will be required, everything considered, to yield xylene solubility. Initially, however, the product must be water-soluble and surface active, at least after treatment with ethylene oxide or the like as noted. This means that in the rule suggested previously, the lower amount of propylene oxide or butylene oxide is apt to be used in connection with the sulfonates of the higher or highest molecular weights, i. e., largest number of carbon atoms in the substituent group or groups. The fact that further generalization is not helpful, is for obvious reasons, to wit, the fact that the substituent may be, as noted, straight chain or branched, cyclic or noncyclic, or both types may be present. Similarly, reference has been made to the use of the oxypropylated or oxybutylated derivatives in lubricating oils. This applies to both synthetic lubricating oils obtained by polymerization of alkylene oxides and lubricating oils obtained from the usual petroleum sources. Insofar that it is only required that the product or products show xylene-solubility and not necessarily kerosene-solubility, this statement may be something of an incongruity. Actually, however, even though the oxypropylation or oxybutylation products do not show kerosene-solubility but only xylene-solubility, yet they can be added to the synthetic polyoxyalkylene lubricants, and also to the conventional lubricates, due to the presence of various polar and semi-polar additives, which are customarily added. Of course, if oxyalkylation yields kerosene-soluble products, they may be more suitable for use as lubricant additives.

There are available a number of petroleum distillates which are in the same distillation range as kerosene, but due to their aromatic character, are not entirely satisfactory, in some instances, for purposes for which kerosene is used. Such materials are sometimes referred to as kerosene-range distillates, or kerosene-range solvents. Insofar that much kerosene ordinarily produced is used for a solvent, rather than for combustion or illumination, no differentiation is made in the present description, for reasons which are obvious. Reference to kerosene-solubility means solubility in a non-aromatic kerosene or similar higher boiling solvent.

As has been pointed out previously, the potassium salts can be used as well as the sodium salts, but have no particular advantage, except perhaps, somewhat greater solubility in xylene and non-polar hydrocarbon solvents.

Actually, having obtained the sodium salt, or, for that matter, the potassium salt, one can also prepare other salts from the free acid which might not necessarily be satisfactory for oxypropylation or oxybutylation, in that the cation would contain a group susceptible to oxypropylation or oxybutylation as is the case in cyclohexylamine, monoethanolamine, diethanolamine, triethanolamine, morpholine, and high molal amines, as, for example, the amines obtained from higher fatty acids. Such salts may vary in water-solubility. Some of those mentioned are just barely water-soluble, or fairly emulsifiable, as a rule.

The water solubility of certain amine salts may be less than the corresponding sodium or potassium salt. Similarly, the water solubility may be greater than the corresponding sodium or potassium salts. Reference to "water solubility" is an approximate term intended to indicate in a general way the amount of propylene oxide or butylene oxide required to convert to water insolubility. Regardless of the solubility characteristics of the amine salts, whether tending to increase the hydrophobe effect or the hydrophile effect, it is still necessary that the corresponding sodium salt show the solubilities specified. As pointed out elsewhere, there is no reason why one may not use an amine salt and subject it to treatment with propylene oxide or butylene oxide, notwithstanding the fact that the salt may be susceptible to oxyalkylation in the amine radical position provided, however, that the corresponding sodium salt still meets the requirement and that there is the degree of oxyalkylation employing either propylene oxide or butylene oxide to meet the herein stated requirement.

Acidification of the sodium or potassium salts yields a correspondingly free acid of the following composition (or the equivalent):

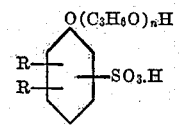

Such materials which are thrown out by hydrochloric acid can be purified in the conventional manner by evaporation, so as to eliminate the inorganic impurities and the acid and can then be neutralized with any convenient base, such as those above enumerated, or with ammonia, tertiary amines, or can be converted into the salts of other metals, such as lithium, calcium, magnesium, strontium, barium, etc. The ammonia and amine salts, particularly when derived from water-soluble amines, have utility as coupling agents in the same manner as previously described. In fact, the salts derived from triethanolamine have unusual value as coupling agents. Those derived from high molal amines show increased oil-solubility over and above the sodium salt, as in the case of the cyclohexylamine salt. These salts are particularly valuable lubricant additives. The copper salt is a valuable additive for materials employed to prevent or repel certain types of insect or microorganic ravage.

In obtaining the free acid from the sodium salt or a potassium salt, if it happened to be employed, it is usually desirable to eliminate the xylene or other solvent prior to acidification. In some instances, the higher oxypropylated or oxybutylated derivatives seem to be slightly heavier than water and may separate at the bottom instead of rising to the top. In some instances, this is purely a question of how much acid is added. In other words, if the specific gravity of the aqueous hydrochloric acid solution is sufficiently high, the product separates at the top; otherwise, it may separate at the bottom. Since the free acid is frequently xylene-soluble, if xylene or some other solvent is present, then and in that event, of course, it affects the specific gravity of the non-aqueous phase, and thus, again may be a factor in determining whether a supernatant layer comes out at the top, or an oily layer saparates, at the bottom. The objection to the use of a salt as a source of the selected cation is only that at least partial neutralization of the sulfonic acid may take place. Needless to say, if one intended to prepare the ammonium salt, ammonium chloride could be used to hasten the separation. Similarly, if the triethanolamine salt is to be formed, triethanolamine hydrochloride (triethanol ammonium chloride) could be employed.

Reference is now made to a number of previous formulae, in which the divalent radical —$(C_3H_6O)_n$— appears. One example is

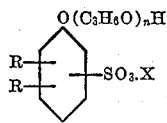

Actually, when such products are obtained in the manner herein described, one does not obtain a single derivative, in which $n$ has one and only one value, for instance, 14 or 15 or 16, or the like. Actually, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes, one need only consider the oxypropylation of a monohydric alcohol, because, in essence, this is substantially the mechanism involved. Even in such instances where one is concerned with a monohydric reactant, one cannot draw a single formula and say that, by following such procedure, one can readily obtain 80% or 90% or 100% of such compound. However, in the case of at least monohydric initial reactants, one can readily draw the formulae of a large number of compounds which appear in some of the probable mixtures, or can be prepared as components and mixtures which are manufactured conventionally.

Simply by way of illustration, reference is made to U. S. Patent 2,549,434 dated April 17, 1951 to De Groote, Wirtel, and Pettingill.

However, momentarily referring again to a monohydric initial reactant, it is obvious that if one selects any such simple hydroxylated compound and subjects such compound to oxyalkylation, such as oxyethylation, oxypropylation, or oxybutylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for the sake of convenience, may be indicated as $RO(C_2H_4O)_{30}OH$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$ in a formula such as

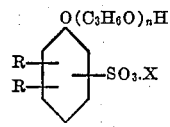

as representing both individual constituents, in which $n$ has a single definitive value, and also with the understanding that $n$ represents the average value, based on completeness of reaction.

This may be illustrated as follows: Assume that in any particular example the molal ratio of the propylene oxide or butylene oxide to the sulfonate is 15 to 1. Actually, one obtains products, in which $n$ probably varies from 10 to 20, perhaps even further. The average value, however, is 15, assuming, as previously stated, that the reaction is complete. The product described by the formula may be described also in terms of method of manufacture, but insofar that a single hydroxyl only is involved, as differentiated from materials obtained by oxypropylation or oxybutylation of polyhydric reactants, it appears more satisfactory to employ the customary formula type description, as long as the obvious limitations are completely understood.

A similar procedure can be employed in connection with phenol sulfonic acids which are amine neutralized or neutralized by means of quaternary ammonium bases such as tetraethanol ammonium hydroxide. The difficulty in the case of the quaternary ammonium bases is that there is a tendency to decompose under conditions of oxypropylation or oxybutylation. In any event, any amine employed, whether primary, secondary or tertiary amine or whether it contains a hydroxyl group or not as in the case of triamine, involves a cation or radical which is oxyalkylation-susceptible. Also, the cation as such may influence the solubility prior to oxypropylation or oxybutylation and also after oxypropylation or oxybutylation.

For instance, the triethanolamine salts of sulfonic acids frequently show greater water solubility or, stated another way, lesser indicated xylene solubility than the comparable sodium salt. This effect may tend to reverse if tripropanolamine or tributanolamine is employed. The effect is also reversed, of course, if the hydrophobe amine such as dodecylamine is employed.

On the other hand, oxyalkylation may be affected by steric factors which vary with individual examples. Neutralization, for example, with triethylamine yields a cation having a labile hydrogen susceptible to oxypropylation or oxybutylation. Actual experience, for example, with triethylamine, seems to indicate that very little, if any, oxypropylation or oxybutylation takes place under usual conditions. Thus, without any variation, any amine salt can be used provided, (1) the solubility characteristics before and after oxypropylation are not changed and, (2) no appreciable oxypropylation takes place at the anion. Actually, the amine radical may be oxyalkylation-susceptible provided that certain limitations are met as described subsequently.

The amine salts are included in the final product for the reason that they can be obtained by previous suggested procedure, i. e., liberating the free acid by conventional neutralization. Thus, having obtained the free acids they may be neutralized with monoethylamine, diethylamine, triethylamine, tetraethylamine, tributylamine, diethylaminoethanol, dimethylaminoethanol, dibutylaminoethanol, ethylamine, n-propylamine, isopropylamine, n-butylamine, sec-butylamine, isobutylamine, 1,3-dimethylbutylamine, triamylamine, and N,N-diethylcyclohexylamine. Needless to say, ammonium hydroxide can be employed.

The amine salts which may be obtained in the manner previously indicated are valuable for certain purposes where sodium or potassium salt is less satisfactory. The purposes are illustrated by their use as an additive to fuel oil to prevent (1) corrosion, (2) separation of solid matter, and (3) hold any moisture in solution or suspension. When fuel oil is burned, and the same for that matter would apply to heavy combustion engines, there is an ash deposit which clogs the burner or causes equivalent mechanical difficulties. The presence of a sodium or potassium salt increases such deposits. Thus, the use of an amine salt is indicated. Suitable amine salts include not only those previously described but also those obtained from polyamines such as ethylenediamine, diethylenetriamine, triethylenetetramine, etc., as well as cycloamidines such as

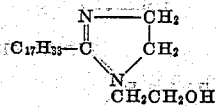

For this reason the free acids as such prior to neutralization represent an inherent part of the present invention.

Needless to say, if a polyamine is used having two or more basic nitrogen atoms one can combine as many sulfonic acid radicals as equivalent to its combining characteristic or, as usually designated, its valency.

Attention is directed to the fact that in the claims reference to a cation is noted and includes, among others, metallic cations. Such cations include sodium, potassium, lithium, calcium, magnesium, aluminum, copper, etc.

As has been previously pointed out, the alkylene carbonates, such as ethylene carbonate, propylene carbonate, butylene carbonate, etc., are simply a convenient source of the corresponding oxides, although having other advantages as indicated. For purpose of clarity of presentation, reference in the claims to "an oxyalkylating agent selected from a class consisting of propylene oxide and butylene oxide or a mixture of the two" obviously includes the carbonates or mixtures of carbonates just as well. The same applies to ethylene carbonate. The two classes of reagents are more than the obvious chemical equivalents being, in fact and in reality, two forms of the same oxyalkylating agent.

It is understood that one can start with a salt form which includes in the cationic group which is in turn an alkylation-susceptible radical, for instance, a suitable sulfonic acid neutralized with triethanolamine. However, under such circumstances oxyalkylation must take place at the hydroxyl position at least to a degree sufficient that the sulfonic acid radical meets the requirement previously indicated and that the corresponding sodium salt is water-insoluble. During such oxyalkylation reaction may also take place at the cation and thus at the end of oxyalkylation the radical is changed to the extent that it would represent an oxyalkylated triethanolamine. Needless to say, in order to determine such distribution, all that is necessary is to split the acid with concentrated caustic soda or the like so as to liberate the amine or oxyalkylated amine and determine its composition, particularly the nitrogen content and molecular weight. In some cases, it is preferable to just split with a strong acid such as HCl. Similarly, the sodium salt would have to be examined for water insolubility. Not only may triethanolamine be employed but also other oxyalkylation-susceptible amines previously mentioned with the full understanding that steric hindrance may be a factor.

Attention is directed to the fact that the present invention includes as reactants sulfonic acids and their salts corresponding to the phenol

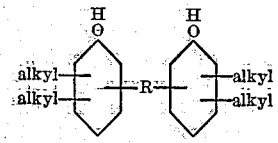

in which R is an aldehyde residue and alkyl represents an alkyl radical which may contain from 2 to 8 carbon atoms and even more as in the case of dinonyl phenol, didecyl phenol, ditetradecyl phenol, etc. Such phenols have been described in various patents and particularly U. S. Patent 2,446,045, dated July 27, 1948, to De Groote et al. Such phenols, when converted into appropriate acids or salts, illustrates the type where there are four alkyl substituents.

However, the instant invention is not intended to include solvent-soluble phenol resins of the kind obtained from a difunctional phenol and formaldehyde or an equivalent aldehyde having generally eight carbon atoms or less. Such soluble resins have been described in a number of U. S. patents, and particularly in U. S. Patents 2,499,365, 2,499,366, 2,499,367, 2,499,368, etc., all dated March 7, 1950, to De Groote et al. Such resins are sometimes described in an over-simplified formula as follows:

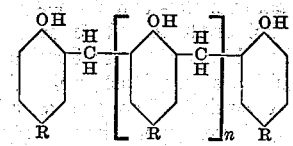

in which $n$ represents a numeral varying from 1 to 13 and R is a substituent, generally a hydrocarbon substituent having from 4 to 18 carbon atoms and may vary from 1 to 24. The formaldehyde nucleus, of course, may be replaced by a radical derived from some other aldehyde. Such resins, as distinguished from phenols, can be dissolved in a suitable solvent such as dioxane, a substituted dioxane, or any other suitable solvents. Such resins in solution can be reacted with anhydrous sulfur trioxide in the conventional manner so as to introduce one or more sulfonic acid radicals. In numerous examples where the value of $n$ has been 1, 2, 3 or 4, and generally 1 or 2, the resin has been reacted with either one mole of sulfur trioxide or two or more moles of sulfur trioxide and the sulfonic acid obtained may be indicated thus

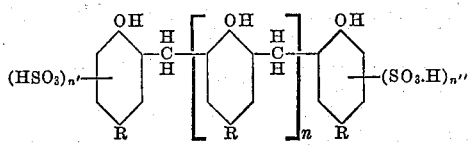

in which $n'$ is 1 and $n''$ is 0 or 1. The acids can be neutralized in a conventional manner using the same procedure as described above in respect to the instant invention. The added solvent may be allowed to remain or can be eliminated by extraction or distillation, particularly vacuum distillation. Water can be eliminated in the usual manner involving either vacuum distillation or the use of a water-insoluble solvent with a phase-separating trap. The solvent-free anhydrous salt can be redissolved, if desired, in a non-oxyalkylation-susceptible solvent such as xylene, cymene, tetralin, high-boiling aromatic naphtha, etc. Such sulfonic acids and, for that matter, their salts such as sodium, potassium, ammonium, diethanolamine salt, triethanolamine salt, etc., would vary all through the solubility range. Specifically, this applies to comparable compounds, thus,

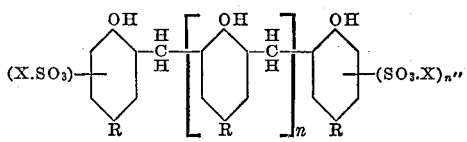

in which X represents a cation which may be hydrogen or may be any one of the metals previously referred to or any one of the amines previously referred to whether oxyalkylation-susceptible or not and either monoamino or polyamino. Needless to say, where X represents a cation having a valency greater than 1, as in the case of a polyamine or in the case of a metal such as zinc, copper, aluminum, etc., the structure becomes more complicated but will be ignored for the present which is only for the purpose of establishing a line of demarkation. However, it is to be noted that the solubility of such compounds depends on factors such as (1) the size of the substituent R, (2) the size of the aldehyde radical, (3) the number of units in the resin molecule, i. e., the value of $n$, (4) the character of the cation X, and (5) the number of sulfonic acid radicals introduced, etc.

Such products may be water-soluble and completely insoluble in xylene or non-aromatic kerosene. Inversely, such products may be completely soluble in non-aromatic kerosene and xylene and absolutely insoluble in water. Whatever the initial characteristics of such products, they may be subjected to oxyalkylation in the manner herein described, both by means of the alkylene oxides and the alkylene carbonates. Oxyalkylation may completely vary the solubility characteristics and surface-active characteristics of the initial products. Reaction may take place at the hydroxyl position only or both at the hydroxyl and the cationic position as previously pointed out in regard to the instant invention. The use of ethylene oxide, glycide, and, to a lesser extent, methyl glycide increases the water solubility properties and decreases solubility in hydrophobe solvents. Inversely, propylene oxide and butylene oxide decreases solubility in hydrophile solvents and increases solubility in hydrophobe solvents. The amount of oxides or carbonates used may represent a 2 to 1, 5 to 1, 10 to 1, 20 to 1, or even 50 to 1 ratio, based on the initial sulfonate. One need not use a single oxide or carbonate but can use a mixture. The products so obtained are useful not only for all the purposes herein enumerated in connection with the present invention but are also useful for a variety of other purposes where surface-active agents serve as, for example, such products can be used for the resolution of petroleum emulsions of the water-in-oil type as described in Part 3 of U. S. Patent 2,626,926, dated January 27, 1953, to De Groote. Furthermore, such products can be reacted with alkylene imines, such as ethylene imine or propylene imine, to produce cation-active materials. Instead of an imine, one may employ what is a somewhat equivalent material, to wit, a dialkylaminoepoxypropane of the structure

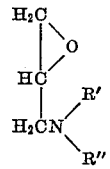

wherein R' and R'' are alkyl groups.

Furthermore, such products, in addition to their use in the resolution of petroleum emulsions, may be used as emulsifying agents for oils, fats, and waxes, as ingredients in insecticide compositions, or as detergents and wetting agents in the laundering, scouring, drying, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous floodwaters. These derivatives also are suitable for use in dry cleaners' soaps.

And, furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

Having thus described my invention, what I claim as new and desire to secure by Letters Patent is:

1. A water-insoluble salt of the following composition:

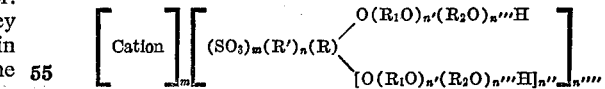

in which R is an aryl nucleus; R' is a hydrocarbon substituent having not over 22 carbon atoms with the proviso that the combined radical $(R')_n R$ contains not over 2 aryl rings; $R_1O$ is an alkylenoxy radical derived from a member of the class consisting of ethylene oxide, glycide, and methyl glycide; $R_2O$ is an alkylenoxy radical derived from a member of the class consisting of propylene oxide and butylene oxide; $m$ is a numeral from 1 to 2; $n$ is a numeral from 1 to 4; $n'$ is a numeral from 0 to 5; $n''$ is a numeral from 0 to 1; $n'''$ is a numeral from 15 to 60; $n''''$ is a numeral from 1 to 6 but not greater than the valence equivalency of the cationic portion of the molecule; said salt being a salt of the acid

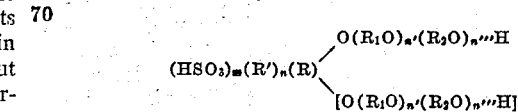

in which the characters have their previous significance.

2. A water-insoluble salt of the following composition:

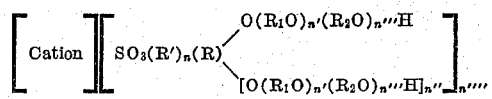

in which R is an aryl nucleus; R' is a hydrocarbon substituent having not over 22 carbon atoms with the proviso that the combined radical $(R')_nR$ contains not over 2 aryl rings; $R_1O$ is an alkylenoxy radical derived from a member of the class consisting of ethylene oxide, glycide, and methyl glycide; $R_2O$ is an alkylenoxy radical derived from a member of the class consisting of propylene oxide and butylene oxide; $n$ is a numeral from 1 to 4; $n'$ is a numeral from 0 to 2; $n''$ is a numeral from 0 to 5; $n'''$ is a numeral from 15 to 60; $n''''$ is a numeral from 1 to 6 but not greater than the valence equivalency of the cation; said salt being a salt of the acid

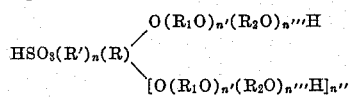

in which the characters have their previous significance.

3. A water-insoluble salt of the following composition:

$$[\text{Cation}][SO_3(R')_n(R)O(R_1O)_{n'}(R_2O)_{n'''}H]$$

in which R is an aryl nucleus; R' is a hydrocarbon substituent having not over 22 carbon atoms with the proviso that the combined radical $(R')_nR$ contains not over 2 aryl rings; $R_1O$ is an alkylenoxy radical derived from a member of the class consisting of ethylene oxide, glycide, and methyl glycide; $R_2O$ is an alkylenoxy radical derived from a member of the class consisting of propylene oxide and butylene oxide; $n$ is a numeral from 1 to 4; $n'$ is a numeral from 0 to 5; $n'''$ is a numeral from 15 to 60; said salt being a salt of the acid $$HSO_3(R')_n(R)O(R_1O)_{n'}(R_2O)_{n'''}H$$

in which the characters have their previous significance.

4. The product defined in claim 3 with the proviso that the radical R be monocyclic.

5. The product of claim 3 with the proviso that the radical R be monocyclic and the total number of substituent carbon atoms in the combined radical $(R')_nR$ be not over 28 and that the combined radical $(R')_nR$ represent an aliphatic substituted phenol radical.

6. The product of claim 1 with the proviso that at least part of the alkylenoxy radical $R_2O$ be derived from butylene oxide.

7. The product of claim 2 with the proviso that at least part of the alkylenoxy radical $R_2O$ be derived from butylene oxide.

8. The product of claim 3 with the proviso that at least part of the alkylenoxy radical $R_2O$ be derived from butylene oxide.

9. The product of claim 4 with the proviso that at least part of the alkylenoxy radical $R_2O$ be derived from butylene oxide.

10. The product of claim 5 with the proviso that at least part of the alkylenoxy radical $R_2O$ be derived from butylene oxide.

References Cited in the file of this patent

UNITED STATES PATENTS

| | | |
|---|---|---|
| 2,135,978 | Magoun | Nov. 8, 1938 |
| 2,143,759 | Bruson et al. | Jan. 10, 1939 |
| 2,166,136 | Flett | July 18, 1939 |
| 2,176,833 | Bruson et al. | Oct. 17, 1939 |
| 2,184,935 | Bruson et al. | Dec. 26, 1939 |
| 2,226,119 | De Groote et al. | Dec. 24, 1940 |
| 2,448,664 | Fife et al. | May 30, 1944 |
| 2,552,528 | De Groote | May 15, 1951 |
| 2,615,853 | Kirkpatrick et al. | Oct. 28, 1952 |